Apr. 3, 1923.
J. JERRY
1,450,294
WELDING TOOL
Filed Dec. 29, 1920
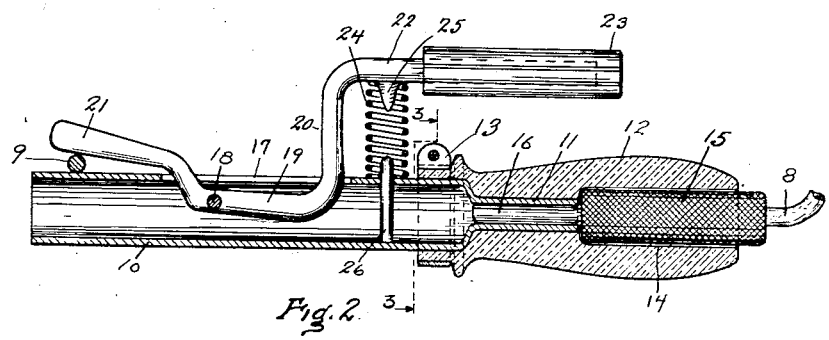
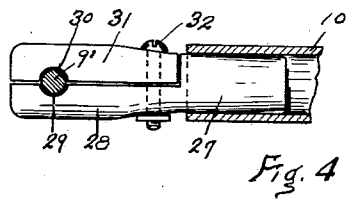
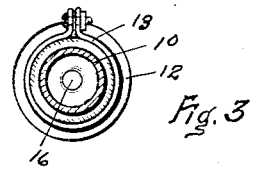
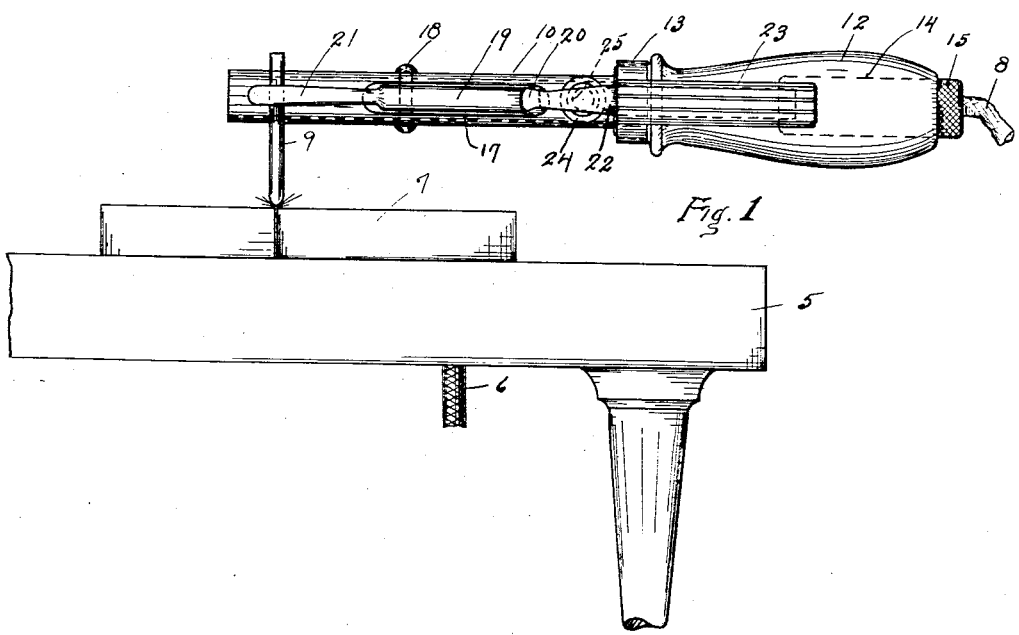
INVENTOR:
John Jerry
By: Morsell + Keeney
ATTORNEYS Patented Apr. 3, 1923.

1,450,294

UNITED STATES PATENT OFFICE.

JOHN JERRY, OF MILWAUKEE, WISCONSIN.

WELDING TOOL.

Application filed December 29, 1920. Serial No. 433,846.

*To all whom it may concern:*

Be it known that I, JOHN JERRY, a citizen of the United States, and resident of Milwaukee, in the county of Milwaukee and State of Wisconsin, have invented new and useful Improvements in Welding Tools, of which the following is a description, reference being had to the accompanying drawings, which are a part of this specification.

This invention relates to certain new and useful improvements in welding devices and refers more particularly to a tool for holding the electrode or fusing strip of an electrical welding device.

The fusing strip holding tools that are now in general everyday use are objectionable in that no means are provided whereby an instant adjustment may be obtained of the fusing strip as the same is generally bolted or otherwise similarly secured to the tool.

Hence with this and other objections in mind to the fusing strip holding tools now in general use, it is one of the objects of my invention to provide a tool having means for so securing or holding the fusing strip that the same may be instantly adjusted by the operator without shifting his hold upon the tool.

Another object of this invention is to provide a welding tool of the class described, which, while illustrated as adapted for use in connection with electric welding, may be also utilized in connection with other types of welding processes.

Another object of this invention is to provide a tool of the class described so designed and constructed that the part in contact with the operator, the handle, is formed of insulating material whereby all danger of injury to the operator, due to his coming in contact with the electrical circuit, is eliminated.

A further object of this invention is to provide a tool of the class described which is capable of instantly adjustably securing the fusing strip and which is so designed and constructed that the same may be produced in quantities at a comparatively low cost.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing, I have illustrated one complete example of the physical embodiment of my invention constructed according to the best mode I have so far devised for the practical application of the principles thereof, and in which:

Figure 1 is a view illustrating my improved tool in operation;

Figure 2 is a view part in section and part in elevation taken longitudinally through the tool;

Figure 3 is a transverse sectional view taken on the line 3—3 of Figure 2; and

Figure 4 is a view part in section and part in elevation of an insert which is adapted to be secured in the end of my improved tool when it is desired to provide a different type of fusing strip clamping means.

Referring now more particularly to the accompanying drawing in which like numerals designate like parts throughout the several views:

The numeral 5 designates a work supporting table which is preferably formed of metal and is connected with one wire 6 of an electrical supply line, and upon which is positioned the work 7 to be welded. The other wire 8 of the supply line is connected with an electrode 9, forming a fusing strip, through my improved tool, now about to be described. The fusing strip 9 upon contacting with the work 7 shorts the electrical circuit and due to the heat created thereby fuses the strip 9 and welds the work as is well known to those skilled in this art.

My improved tool consists of a tubular shank member 10 having its inner end reduced, as at 11, and set in a handle 12 of insulating material. The handle 12 has a snug fit with the shank member and is further secured in place by a clamp ring 13 which binds the inner end of the handle about the adjacent portion of member 10. The outer end of the handle 12 is centrally bored or recessed, as at 14, to receive the insulated end of a plug 15 having its terminal 16, which is in connection with wire 8, telescoped in the reduced shank member end 11. The terminal 16 may be either permanently or removably secured in position, and with this construction the lead wire 8 extends from the extreme end of the handle 12 where the same will be completely out of the way of the operator.

The shank member 12 has a longitudinally extending recess 17 in one wall thereof in which is pivotally secured, as at 18, the medial bent portion 19 of a lever 20. The portion of the lever 20, outwardly of pivot 18, overlies the shank member 10 to form a clamp member 21 and the inner end of said lever extends laterally and then rearwardly, as at 22, to overly the handle portion 12. Secured upon the end 22 is a grip 23 of insulating material, and confined between end 22 and the adjacent part of shank member 10 is an extensile spring 24 which normally urges end 22 outwardly and consequently end 21 inwardly toward the adjacent part of the shank member. The spring 24 has its outer end coiled about a guide or stud 25 carried by the lever end 22 and has its inner end coiled about a guide pin 26 carried by the shank member. With this construction, the operator may readily grasp handle 23 to compress spring 24 and release the engagement of part 21 with the electrode 9 whereby the instant adjustment of the electrode may be obtained.

As, sometimes, it is desirable, to have a clamp of a different type engage a carbon electrode 9′ in some forms of welding, I provide the attachment illustrated in Figure 4 which consists of a plug 28 which is removably engageable in the outer end of the shank member and has its outer end 28 provided with a semi-circular recess 29 adapted to aline with a corresponding recess 30 in a removable clamping portion 21, which is secured to the part 28 by a clamping bolt 32. It will be noted that the tubular construction of the shank 10 provides a very light and strong structure, which presents a relatively large surface to the surrounding atmosphere, whereby that portion of the tool may be effectively air cooled.

What I claim as my invention is:

1. A tool of the class described, comprising a handle, a shank member carried by the handle, said shank member having a slot cut therein, a lever having a medial bend disposed in said shank member slot, means pivotally securing said lever bend in the slot, a clamp member formed on the outer end of said lever, a handle portion formed on the inner end of said lever, and means yieldingly urging said clamp member toward the shank member.

2. A tool of the class described, comprising a tubular metal shank member provided with a longitudinally extending slot, a handle of insulating material secured to one end of said member, a lever passing through said slot and medially pivotally secured to the shank member, a clamp member on the outer end of said lever and overlying said shank member, a handle portion on the inner end of said lever and overlying said handle, means urging said clamp member toward the shank member, and means passing through said handle and connecting the shank member with an electrical feed wire.

In testimony whereof, I affix my signature.

JOHN JERRY.